United States Patent

Adams et al.

[15] 3,676,875
[45] July 11, 1972

[54] METHOD AND APPARATUS FOR TRANSMITTING INFORMATION IN METER READING

[72] Inventors: Rodney V. Adams; Roger E. Medlin, both of Raleigh, N.C.

[73] Assignee: Westinghouse Electric Corporation, Pittsburgh, Pa.

[22] Filed: March 10, 1970

[21] Appl. No.: 18,188

[52] U.S. Cl.....................340/183, 340/204, 340/210
[51] Int. Cl. ...................................G08c 19/28, G08c 15/12
[58] Field of Search..........................340/188, 183

[56] References Cited

UNITED STATES PATENTS

| | | | |
|---|---|---|---|
| 3,201,755 | 8/1965 | Brixey | 340/183 |
| 3,264,633 | 8/1966 | Hellar | 340/183 |
| 3,266,018 | 8/1966 | Higgins | 340/183 |
| 3,313,160 | 4/1967 | Goldman | 340/183 |
| 3,430,217 | 2/1969 | Bridge | 340/183 |
| 3,478,342 | 11/1969 | Alldritt | 340/183 |

*Primary Examiner*—Thomas B. Habecker
*Attorney*—A. T. Stratton and C. L. Freedman

[57] ABSTRACT

For transmitting information representing the readings of a plurality of meters a separate translating unit is provided. This unit includes a separate encoder for each of the meters which converts analog information derived from the associated meter into digital information. The translating unit preferably includes a scanner for interrogating successively the outputs of the encoders. Information from the scanner is transmitted to a translator which may comprise a device for recording the transmitted information or which may comprise a computer for performing desired operations on the information. If the output of the scanner is to be modified before transmission to the translator the translating unit desirably may include an interface for performing the desired modification. If the meters to be read include an electric meter and a fluid meter preferably electric energy required for operating the translating unit is derived from the source of electric energy being measured by the electric meter.

7 Claims, 4 Drawing Figures

Patented July 11, 1972 3,676,875

WITNESSES
Helen M. Farkas
James F. Young

INVENTORS
Rodney V. Adams &
Roger E. Medlin
BY C. L. Freedman
ATTORNEY 3,676,875

METHOD AND APPARATUS FOR TRANSMITTING INFORMATION IN METER READING

CROSS-REFERENCES TO RELATED APPLICATIONS

Certain apparatus for transmitting information from a meter to a remote point is disclosed and claimed in a copending U.S. Pat. application Ser. No. 816,503, filed Apr. 16, 1969 by Emil deCoudras Hoffman.

BACKGROUND OF THE INVENTION

1. Field of the Invention

This invention relates to the transmission of information from a plurality of meters to a remote point and it has particular relation to the transmission of information from a combination of electric and fluid meters.

2. Description of the Prior Art

It is .he practice for a company such as a public utility to supply a number of services such as electric energy, heat, water and gas to consumers. It is common practice for a utility to charge each consumer an amount based on the quantity of the service supplied to the consumer.

In order to determine the amount of the service supplied to each consumer a meter is usually installed on the premises of each consumer for measuring each service. At the end of each billing period employees of the utilities proceed to the premises of the consumers for the purpose of reading the meters.

Many systems have been proposed for reading meters automatically. On such a system an encoder may be provided on each meter to be read and a scanner may be associated with each encoder.

Because of the presence of different services and because different meter manufacturers may be involved compatibility of the equipment is a problem.

. To illustrate prior art proposals reference may be made to the U.S. Pat. No. 3,299,423.

SUMMARY OF THE INVENTION

The invention provides a translating unit which is separate from the meters. This translating unit contains the encoders, a scanner and if necessary an interface for adapting the information developed by the translating unit for transmission over telephone lines or any other communication link. The translating unit may have any number of encoders associated with any combination of meters. For the purpose of discussion the invention will be described as applied to electric meters and fluid meters such as gas and water meters.

Each meter contains a switching device which preferably is a single-pole double-throw switching device which will change state for every unit or multiple of each unit to be measured such as gallons, cubic feet or kilowatt hours.

The encoders at the translating unit convert analog information derived from the meters into a form more suitable for transmission. Desirably each of the encoders may take the form of an analog-to-digital converter which converts analog information derived from the associated meter into digital information in binary form which may be recorded or transmitted to a central station. A scanning device located in the translating unit successively transmits information from each of the encoders to the central station.

Where the translating unit is associated with both fluid and electric meters preferably all electric energy required for operation of the translating unit is derived from the source of electric energy being measured by the electric meter.

BRIEF DESCRIPTION OF THE DRAWINGS

For a better understanding of the invention reference may be had to the preferred embodiment exemplary of the invention shown in the accompanying drawings, in which.

DESCRIPTION OF THE PREFERRED EMBODIMENT

Figure 1:
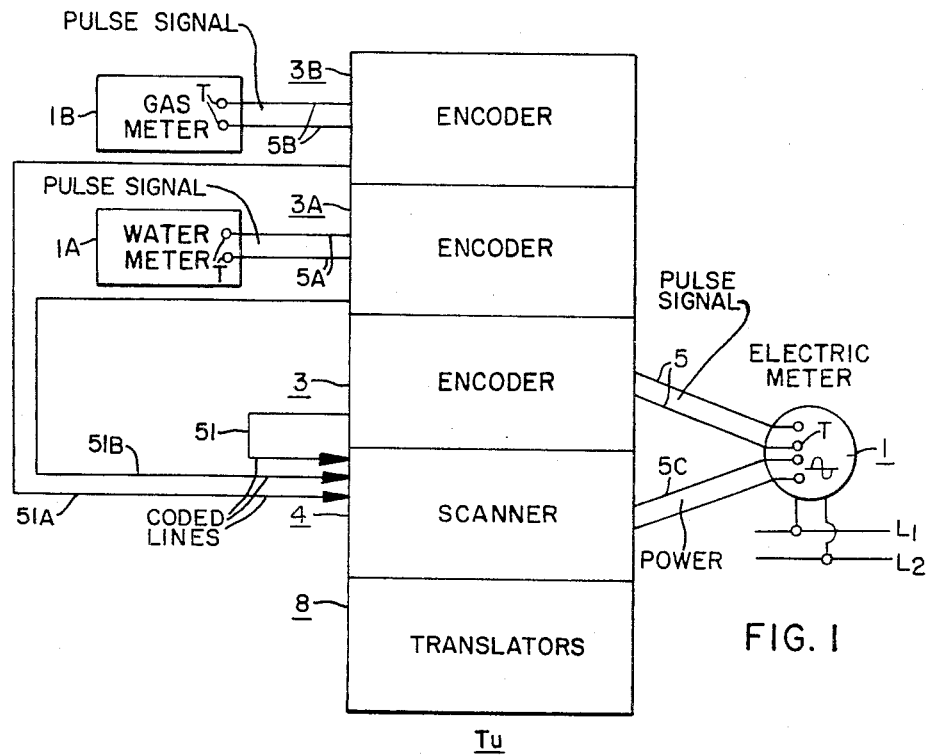
FIG. 1 is a schematic view in block form showing a translating unit associated with meters.
Figure 3:
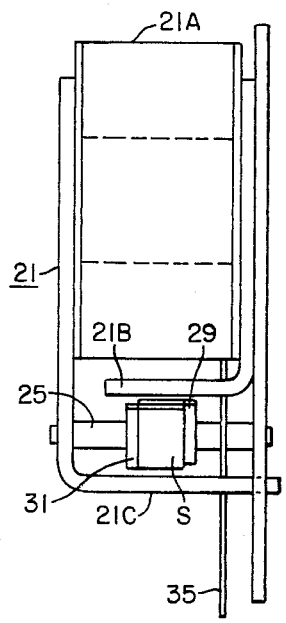
FIG. 3 is a view in side elevation of a motor employed in the embodiment of FIG. 2B.

Referring to the drawings, FIG. 1 shows a plurality of meters, such as three meters 1, 1A and 1B, which are to be read. It will be assumed for present purposes that the meter 1 is an electric watthour meter and that the meters 1A and 1B are flow meters which are respectively a water meter and a gas meter. Information from the meters 1, 1A and 1B is derived in analog form and is supplied respectively to encoders 3, 3A and 3B which convert the analog information into a form more suitable for transmission to a suitable translator. The encoders are embodied in a translating unit TU which is separate from the meters and which is connected to the meters through suitable conductors included in signal transmission circuits 5, 5A and 5B.

The translating unit TU also includes a scanner 4 which is employed for interrogating successively the outputs of the encoders and for transmitting the information derived from the three encoders successively to a suitable translator. If the communication link to the translator so requires, an interface also is included in the translating unit TU for the purpose of modifying the output of the scanner suitably for transmission to the translator.

Electric energy for operating the translating unit preferably is derived from the source of electric energy measured by the electric meter and applied through a circuit 5C.

Figure 2:
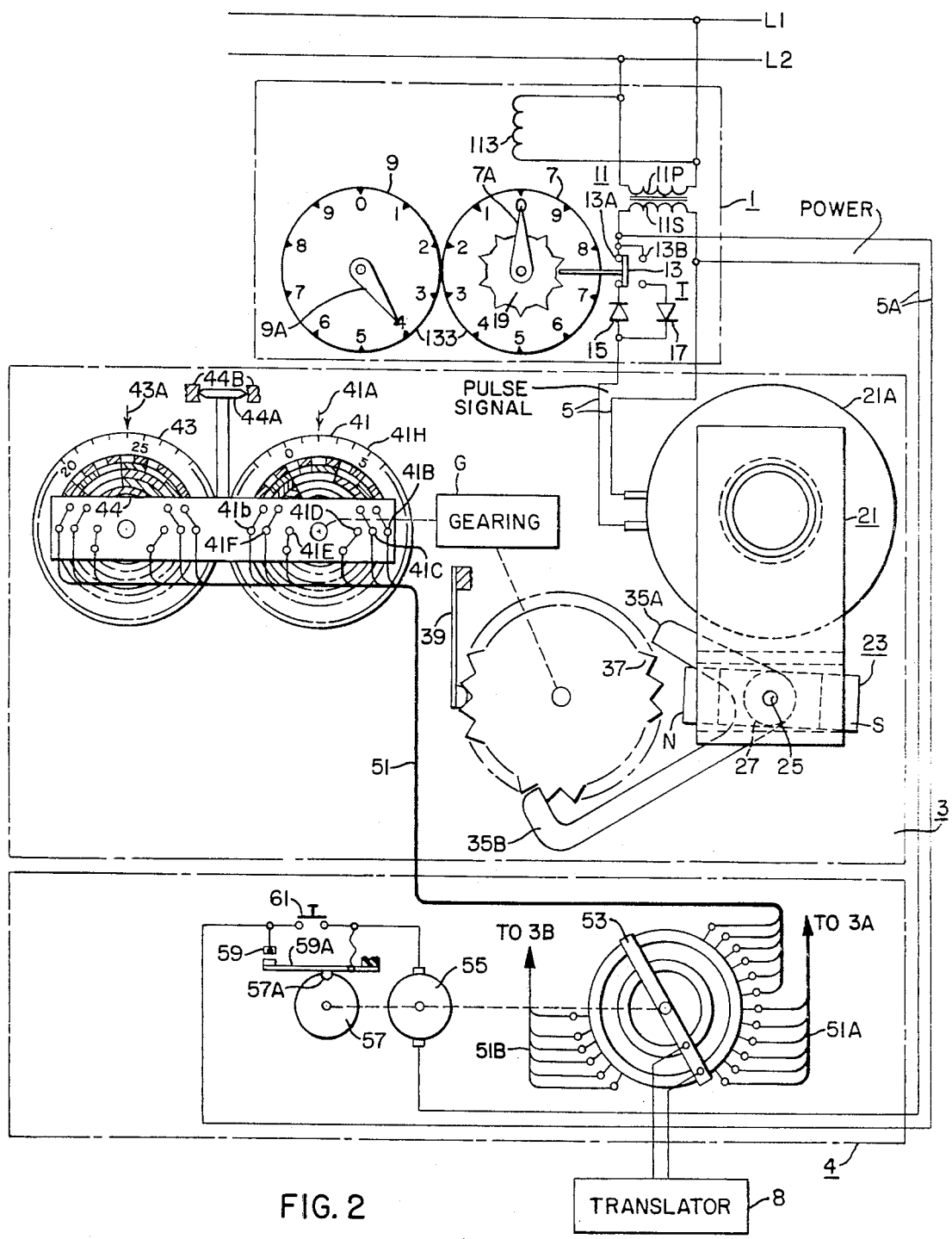
FIG. 2 is a schematic view showing the translating unit connected to an electric meter for supplying information from the meter to a translator.

Each of the meters includes a transmitter T shown in FIG. 2 for trans-mitting information in analog form to the associated encoder. Inasmuch as the transmitters for the meters may be similar in construction it will suffice to describe the transmitter T associated with the meter 1 which is shown in FIG. 2.

To simplify the presentation of the invention it will be assumed that the meter 1 is of the type illustrated in the Ramsey Jr. et al. U.S. Pat. No. 3,309,152, which issued Mar. 14, 1967. This patent discloses a conventional register 133 which is reproduced in part in the present FIG. 2 with the same reference character applied thereto. The conventional register employs several decade counters for the purpose of indicating the electric energy, usually in kilowatt hours, which has been supplied by a public utility to the metering station. For example, the units dial 7 has a pointer 7A mounted for rotation relative thereto for the purpose of indicating units of kilowatt hours from zero to 10. A second dial 9 has a pointer 9A mounted for rotation relative thereto for the purpose of indicating kilowatt hours in the amount of 10 to 100. Several orders of dials and pointers are usually provided and the aforesaid patent shows 5 orders of pointers and dials in an arrangement which is well known in the art.

It will be assumed that the meter 1 is energized from a single-phase two-wire alternating-current circuit operating at a power frequency such as 60 Hertz and represented by conductors L1 and L2.

A winding 113 which corresponds to the voltage winding of the aforesaid patent is shown connected across the conductors L1 and L2.

The meter 1 also has a transmitter T for transmitting signals to the encoder 3. This transmitter is utilized for generating signals which may be in the form of pulses having a polarity reversal rate which is dependent on an analog of the energy quantity being measured by the meter. Transmitters for this purpose are known in the art. For illustrative purposes the transmitter T for each meter is energized from the conductors L1 and L2 through a transformer 11 having a primary winding 11P connected across the conductors L1 and L2 and having a secondary winding 11S which is designed to have an output voltage preferably less than 20 volts, such as a voltage of the order of 12 volts. The secondary winding 11S supplies current to both the circuit 5C and to the signal transmission circuit 5 such that in the circuit 5 opposite polarity currents flow alternately through two circuits which are controlled by a switch unit included in the transmitter T. Each of the other signal transmission circuits 5A and 5B shown in FIG. 1 is a similarly connected series circuit including a transmitter switch unit and the input to an associated encoder which series circuit is connected in parallel with the secondary winding 11S. The switch unit may comprise magnetically-operable reed switches of a conventional type which are magnetically operated at a rate dependent on the quantity being measured. In FIG. 2 one of the circuits includes a rectifier 15 and a first set of contacts 13A of a mechanically-operated switch 13. The second circuit includes a rectifier 17 which is controlled by a set of contacts 13B of the switch 13. If desired the rectifiers may be located in the encoder with three connecting wires extending between the transmitter T and the encoder. However the location in the transmitter T is preferred. The switch 13 desirably is of a type which moves between a position closing the contacts 13A and a position closing the contacts 13B with a snap action or with negligible time delay.

As illustrated in FIG. 2, the switch 13 is operated by a cam 19 which is mounted on the shaft supporting the pointer 7A for rotation in unison with the pointer. The switch 13 has an operating stem which serves as a cam follower biased toward the cam 19. The cam has one or more lobes for moving the switch 13 to the right as viewed in FIG. 2. In a preferred embodiment of the invention the cam 19 has ten cam lobes uniformly distributed about the axis of the cam. As a cam lobe moves past the switch stem it forces the switch to the right as viewed in FIG. 2A to open the contacts 13A and close the contacts 13B. As the lobe passes the stem the spring bias acting on the stem moves the switch 13 to open the contacts 13B and close the contacts 13A. As previously noted these movements of the switch 13 preferably are effected with no substantial time delay.

By inspection of FIG. 2 it will be noted that the rectifiers 15 and 17 are oppositely poled. Thus when the switch 13 closes the contacts 13A, a group of unidirectional pulses having a first polarity are supplied to the circuit 5. When the switch 13 closes the contacts 13B, a group of unidirectional pulses having a second or opposite polarity are supplied to the circuit 5.

At the encoder 3 signals transmitted by the circuit 5 are converted in any suitable manner into a form suitable for transmission to an information center or for recording. In the embodiment illustrated the signals from the circuit 5 are utilized for energizing the coil 21A of an electromagnet 21. This electromagnet has a soft magnetic circuit terminating in two spaced poles 21B and 21C between which a magnetic field is established which has a direction dependent on the polarity of the pulses applied to the coil 21A.

A polarized permanent-magnet armature 23 is located between the poles 21B and 21C. This armature is polarized to provide a north pole N and a south pole S. The armature is mounted for rotation about the axis of a shaft 25 for a limited distance.

Figure 4:
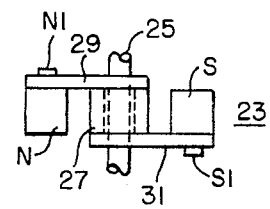
FIG. 4 is a view in top plan of an armature employed in the embodiment of FIG. 2.

As shown in FIG. 4, the armature 23 may comprise a tubular permanent magnet 27 which is concentric with respect to the shaft 25. This magnet is constructed of a high-coercive material such as a barium-ferrite material. The pole N is in the form of a block of soft magnetic material having a pin N1 which is pressed into a hole provided in a soft magnetic arm 29 which is secured to the shaft 25. Similarly the pole S has a pin S1 which is a press fit in a hole provided in a soft magnetic arm 31 which is secured to the shaft 25. The permanent magnet 27 is magnetized to provide a desired polarity of the poles N and S.

A double pawl 35 having pawl arms 35A and 35B is secured to the shaft 25 for rotation therewith. The pawl arms cooperate with the teeth of a toothed wheel 37 which is mounted for rotation relative to the electromagnet about an axis parallel to the axis of the shaft 25. A spring detent 39 is mounted to hold the toothed wheel 37 in any position to which it is rotated by the pawl 35. The pawl 35 and the tooth wheel 37 are so configured that each movement of the pawl 35 rotates or steps the wheel 37 in the same direction.

At the encoder 3 a suitable device is provided for converting the analog information represented by rotation of the wheel 37 into digital information. The device illustrated includes a dial 41 which is coupled through gearing G (assumed here to have a one-to-one ratio) to the wheel 37 for rotation in steps relative to an index mark 41A. The dial is divided into a predetermined number of divisions, 32 divisions in the embodiment here shown. A second similar dial 43 is moved relative to an index mark 43A. The dial 43 is coupled to the dial 41 for a jump movement of one step (11¼° in the example shown) upon completion of each revolution of the dial 41.

Digital information representing the angular position of each step of each of the dials is derived. To this end a plurality of brushes are associated with commutators on the face of each dial. Thus six brushes 41B to 41G for the dial 41 are mounted on a plate 44 which is secured to a shaft 44A pivotally mounted by pivots 44B so that the brushes can be rotated into and out of engagement with commutators on the face of the dial 41. Each brush is positioned to engage a separate circular array of conductive segments on the face of the dial 41. Each conductive segment is maintained at a predetermined voltage relative to ground preferably derived from the secondary winding 11S through a rectifier (not shown). When a brush such as a brush 41B engages a conductive segment such as the segment 41H the brush has a binary one value. When the brush engages an insulation section of the commutator it has a binary zero value. By proper construction of the commutators the voltages applied to the brushes 41B to 41G represent in binary form the angular position of the dial for each of its 32 steps. This type of converter is well known and is discussed for example on p. 284 of Digital Computer Fundamentals by Thomas C. Bartee, published by McGraw-Hill Book Company, Inc., New York City.

Brushes 43B to 43G are similarly associated with the dial 43.

Each of the dials 41 and 43 generates or defines a five bit binary number. One of the six brushes is a ground or common-return brush. The higher-order dial 43 generates the first five highest order bits of a 10-bit number and the right-hand dial 41 establishes the five lower order bits. With a 10-bit binary number for transmission a count of 1,023 can be registered before a recurrent zero is reached. If each bit represents 10 kilowatt hours a count of 10,000 kilowatt hours can be registered and this is adequate for conventional meters.

As shown in FIG. 2 the brushes for the encoder 3 are connected by a cable 51 to members of a group of commutator segments located in the scanner 4. The group of commutator segments may include segments which generate a binary identification number which identifies the specific meter being read. This number may be transmitted immediately before the reading of the meter is transmitted. Another group of commutator segments of the scanner 4 has members which are connected by a cable 51A to the corresponding brushes of the encoder 3A. A third group of commutator segments of the scanner 4 would have members connected similarly by a cable 51B to the encoder 3B. Binary identification numbers may be generated for each of the groups of commutator segments.

The commutator segments of the scanner are interrogated by brushes carried by an arm 53 which is mounted on the shaft of a synchronous motor 55. Consequently when the arm 53 is rotated the brushes associated therewith pick off successively the voltages applied to the brushes and these voltages are then transmitted to the translator 8 which may be a recording device for recording the information on tape or it may be a computer for performing any desired function such as billing.

At the end of each billing period the synchronous motor 55 may be energized to make one revolution for the purpose of interrogating the various encoders. Three encoders are employed in the illustrated embodiment but any number could be provided as desired. Such operation is illustrated by a cam 57 mounted on the motor shaft and having a recess 57A. A switch 59 has a cam follower 59A which rides on the surface of the cam. In the position shown the cam follower 59 is received in the recess 57A and the switch 59 is in open condition. When the motor 55 rotates a short distance the cam follower 59A rides up out of the recess to close the switch 59. It will be noted that the motor 55 is energized through the switch 59. When the motor is to be energized a relay or switch 61 is closed to shunt the switch 59. As soon as the motor rotates sufficiently for the switch 59 to close, the switch or relay 61 may be released and the motor 55 then will complete one revolution of operation.

The relay or switch 61 may be operated automatically for a short time at the end of each billing period. Alternatively the switch 61 may be manually operated to initiate a scanning operation.

In order to explain the operation of the system, it will be assumed that the parts are in the positions illustrated in FIG. 2 and that the pointer 7A is rotating for the purpose of indicating the electric energy being measured at the metering station. At this time, the contacts 13A are closed and the coil 21A thus is connected across the secondary winding 11S through the rectifier 15. This results in the application to the coil 21A of a group of unidirectional pulses which are assumed to be in the proper direction to make the pole 21B, a south pole and the pole 21C a north pole. The resulting magnetic attraction between the armature 23 and the poles 21B and 21C holds the armature in the position shown in FIG. 2. When the next cam lobe of the cam 19 passes beneath the stem of the switch 13 the switch is forced rapidly to the right as viewed in FIG. 2. As a result of the opening of the contacts 13A the pulses supplied through the rectifier 15 cease. However because of the prompt closing of the contacts 13B, the coil 21A is connected across the secondary winding 11S through the rectifier 17. The secondary winding now supplies a group of unidirectional pulses to the coil 21A which are in a direction making the pole 21B a north pole and the pole 21C a south pole. The attraction of the armature 23 relative to the poles 21B and 21C results in a counterclockwise rotation of the armature 23 about its axis as viewed in FIG. 1 and the arm 35A advances the toothed wheel 37. The attraction between the armature 23 and the poles 21B and 21C holds the armature securely in its new position. The movement of the toothed wheel 37 advances the dial 41.

When the cam lobe passes the stem of the switch 13, the bias of the switch rapidly moves the switch to open the contacts 13B and close the contacts 13A. This discontinues the supply of pulses through the rectifier 17 to the coil 21A and restores the supply of pulses to the coil through the rectifier 15. The pulses now supplied to the coil make the pole 21B a south pole and the pole 21C a north pole. The resulting attraction forces are such that the armature 23 is rotated in a clockwise direction as viewed in FIG. 1 to the position shown in such figure. The pawl arm 35B now engages the toothed wheel 37 for the purpose of advancing the toothed wheel. The toothed wheel in turn advances the dial 41.

Each of the two arms 35A and 35B advances or steps the toothed wheel through an angular distance for each cycle of operation of the pawl. In the specific embodiment herein discussed, the total of these two angular distances is 11¼°. Thus each step may be through an angular distance of 5⅝°. In actual practice, it is convenient to employ two unequal angular distances.

This restores the parts to the assumed starting positions and completes the cycle of operation. As the pointer 7A continues to rotate, each passage of a cam lobe past the stem of the switch 13 causes a repetition of the aforesaid cycle.

It will be noted that the dial 41 is advanced only when the polarity of the signal transmitted by the circuit 5 is reversed. This minimizes the possibility of false registration at the encoder due to intermittent initial closure of the switch 13.

There is substantially no "off" period in signal transmission over the circuit 5. The movement of the switch 13 is small and rapid. This minimizes possibility of movement of the dial 41 as a result of vibration of externally induced transients.

For the same reason, the armature 23 is substantially always attracted to one or the other of its positions. In effect, it is "latched" in one position or the other by the magnetic attraction between the armature and the fixed poles. This minimizes the possibility of false registration at the remote station in the case of a loss of supply voltage during the transmission of an operating signal and also minimizes the possibility of any movement of the pointers of the remote register as a result of vibration during such periods.

As previously noted the scanner is actuated at the end of each billing period to "read" the outputs of the encoders. If desired at the end of a reading operation the dials 41, 43, etc. may be reset to zero. For present purposes it will be assumed that the reading of a meter at the end of one billing period is subtracted from the reading for the succeeding period for the purpose of ascertaining the new consumption value.

We claim as our invention:

1. In a system for transmitting information from a plurality of meters at one location to a common information center at a remote location wherein each meter has a mechanical register and at least one of the meters is an electric meter connected to an electrical power source having an electrical quantity measured at said one location by such electrical meter, the combination comprising: plural pulse signal means each being located at one of said plurality of meters, each of said plural signal means indicating movement of an associated meter register so as to signal in accordance with changes in indications of such register; a plurality of encoder means located at said one location and remotely of said plurality of meters, each of said plurality of encoder means having an input control means and coded output lines; a plurality of pulse signal transmission circuits, each pulse signal transmission circuit separately connecting the signal means of one of said meters to said input control means of one of said encoder means; and an energizing circuit means connecting said electrical power source and said plurality of encoder means so that said electrical power source is coupled to each pulse signal transmission circuit simultaneously and each of said encoder means is continuously conditioned to correspond to information indicated by the register of an associated meter when said energizing circuit means is rendered operable by said electrical power source.

2. A system as claimed in claim 1 including a scanner having input means connected for successively scanning the encoder output lines to deliver to a scanner output means successive outputs representing the outputs of the encoder means.

3. A system as claimed in claim 1 wherein said electric meters is an electric watthour meter and another of said meters is a fluid meter.

4. A system as claimed in claim 3 wherein each of said meters has an output developed by an associated pulse signal means in the form of analog pulses, and each of said encoder means converts an analog input into a digital output.

5. A system for transmitting information from plural meters at one location to a common information center wherein each of the meters includes a mechanical register and at least one of the plural meters is an electric meter connected to an electric power source so as to develop a source of potential therein in response to electrical energy of said electrical power source to be measured at said one location, the system comprising: a plurality of pulse transmitter switches each being separately located within one of said plural meters, each of said switches including an actuator movable by indicating movement of the register, each switch being alternately closed and opened in response to movement of said actuator; a plurality of encoder means located at said one location and remote from said meters, each of said encoders having an input control means and coded output lines developing variable coded information when successive pulse signals are applied to said input control means; a single power circuit continuously connected between said source of potential at said electric meter and each of the remotely located encoder means; a plurality of pulse signal transmission circuits, each of said transmission circuits series connecting said input control means of one of said encoder means and one of said switches and in parallel with said source of potential such that said successive pulse signals are developed at said input control means of an associated encoder means in accordance with said opening and closing of said switches and concurrently said coded information of each of said output lines continuously corresponds to indications of an associated register.

6. A system as claimed in claim 5 wherein each of said plurality of encoder means includes a rotatable drive means responsive to said pulse signals applied to an associated input control means.

7. A system as claimed in claim 6 including a scanner including plural inputs, each input being connected to one of the coded output lines, said scanner further including, an output and a movable contact arm for selectively connecting said plural inputs with the scanner output, and said scanner still further includes a motor means for driving said movable contact arm, said motor means being connected to said source of potential supplied by said electrical power source.

* * * * *